Feb. 27, 1973  F. HEGAR ET AL  3,718,213
WHEEL HUB CLUTCHING MECHANISM
Filed Feb. 24, 1971  2 Sheets-Sheet 1
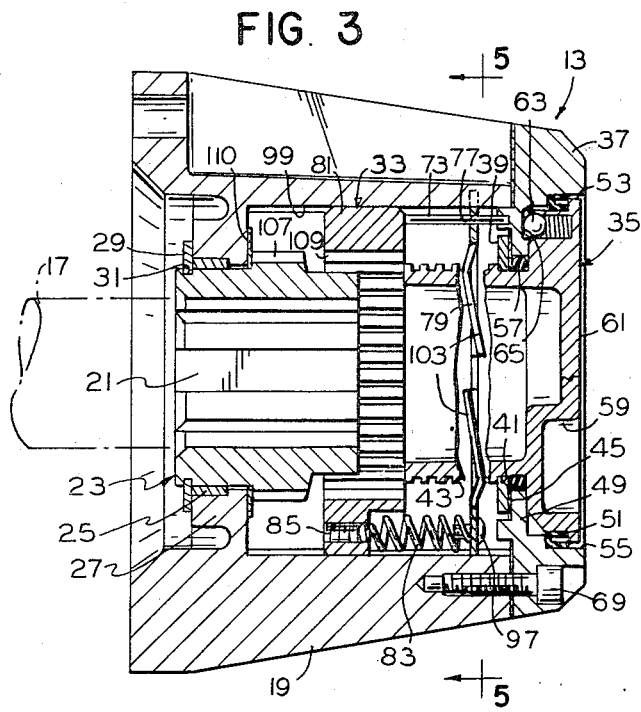
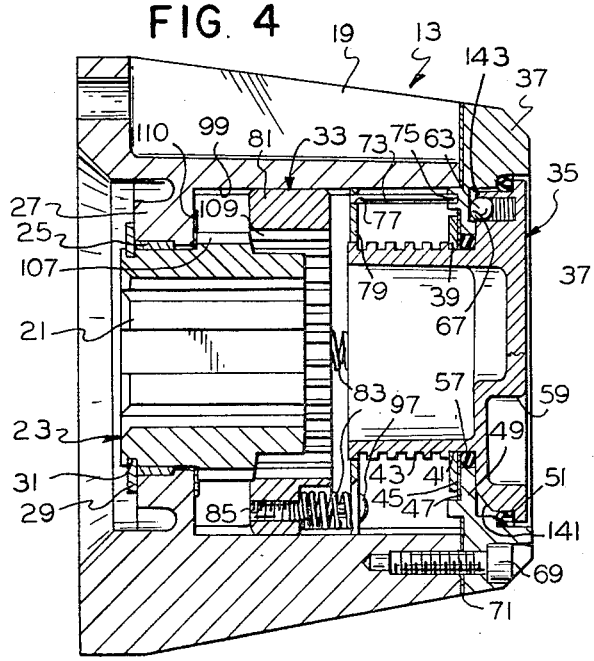
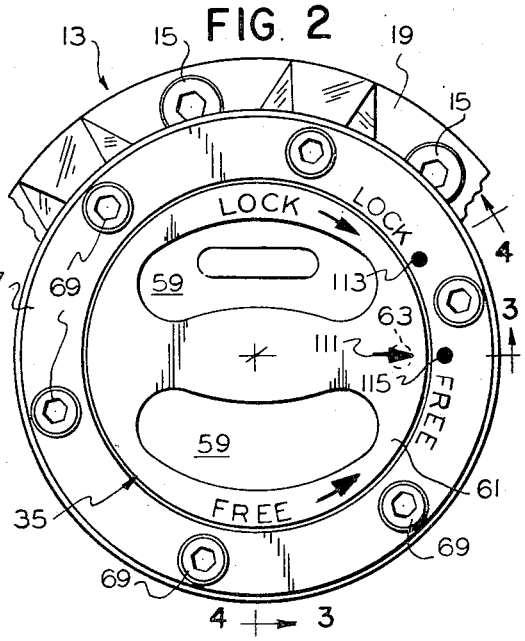
FRANK HEGAR
TIMOTHY E. FLESKES
INVENTORS.
BY
BUCKHORN, BLORE, KLARQUIST & SPARKMAN
ATTORNEYS

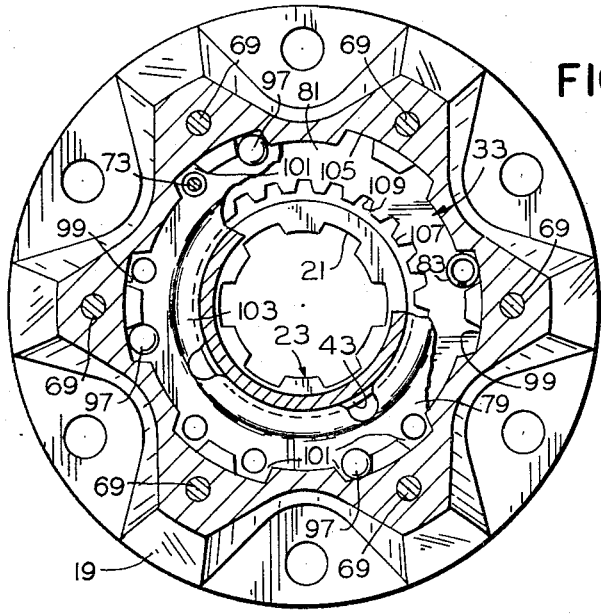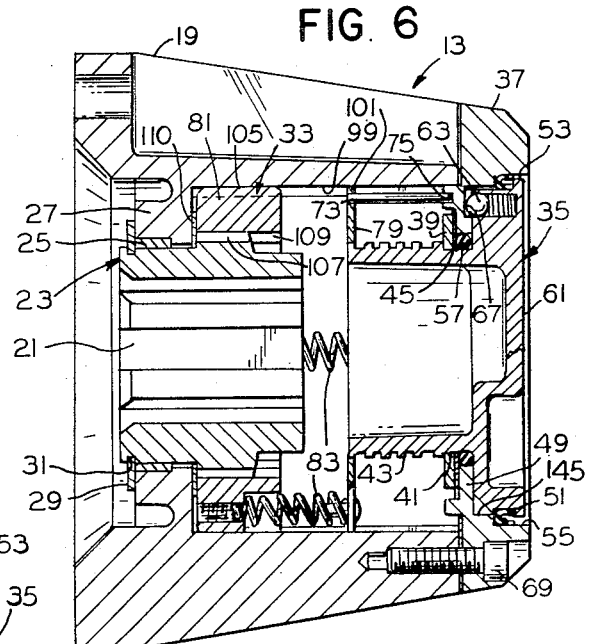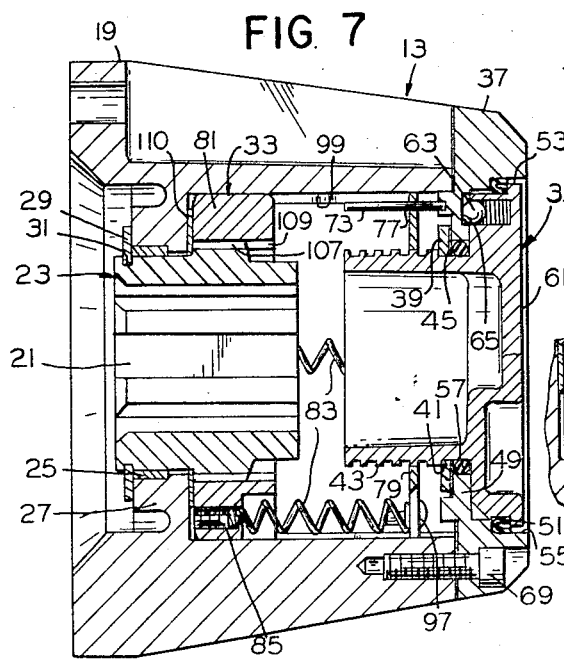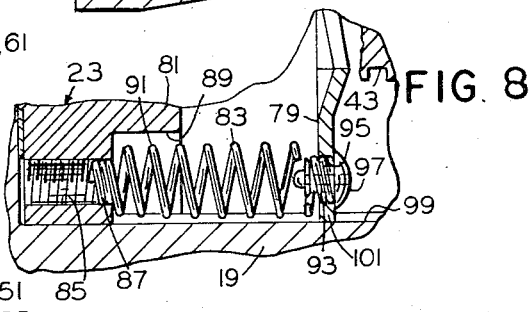

3,718,213
WHEEL HUB CLUTCHING MECHANISM
Frank Hegar, Oregon City, and Timothy E. Fleskes, Portland, Oreg., assignors to Warn-Belleview, Inc., Portland, Oreg.
Filed Feb. 24, 1971, Ser. No. 118,294
Int. Cl. F16d *11/04*
U.S. Cl. 192—67 R                                     13 Claims

ABSTRACT OF THE DISCLOSURE

A wheel hub clutching mechanism has a dial which, when turned to a "free" position, moves an actuator nut to place springs under tension to move a clutch out of mesh with a shaft driven pinion. When the dial is moved to a "lock" position, it moves the actuator nut to place the springs under compression to move the clutch into mesh with the pinion. The dial has a threaded portion which drives the nut along a splining rod which insures correct indexing of the nut relative to the dial.

---

This invention relates to an improved wheel hub clutching mechanism, and more particularly to an improved attachable-detachable hub clutching mechanism.

An object of the invention is to provide a new and improved wheel hub clutching mechanism.

Another object of the invention is to provide a new and improved attachable-detachable hub clutching mechanism.

A further object of the invention is to provide a hub clutching mechanism including an actuator nut driven by a manually operable driver with a splining member insuring correct indexing of the nut and the dial during assembly.

Another object of the invention is to provide a hub clutching mechanism having springs which act both in tension and compression to move a clutch member into and out of clutching condition.

In the drawings:

In FIG. 1 is a fragmentary perspective view of a front wheel hub clutching mechanism forming one embodiment of the invention;

FIG. 2 is an enlarged end view taken along line 2—2 of FIG. 1;

FIG. 3 is a vertical sectional view taken along line 3—3 of FIG. 2;

FIG. 4 is a vertical sectional view taken along line 4—4 of FIG. 2 with parts moved for convenience of illustration;

FIG. 5 is a vertical sectional view taken along line 5—5 of FIG. 3;

FIG. 6 is a vertical sectional view similar to FIG. 4 but with parts moved for convenience of illustration;

FIG. 7 is a vertical sectional view similar to FIG. 3 but with parts moved for convenience of illustration; and FIG. 8 is an enlarged fragmentary sectional view of a portion of the clutching mechanism of FIG. 1.

Referring now in detail to the drawings, there is shown therein a clutching mechanism forming one embodiment of the invention and including a vehicle front hub 11 and a front wheel hub clutching mechanism 13 forming the present invention. The mechanism 13 is mounted on the hub by capscrews 15 and permits the torque from a front axle 17 to be coupled to and uncoupled from the wheel carrying hub 11 to selectively provide two wheel or four wheel drive. The axle shaft 17 is provided with a splined end portion fitting in a splined bore 21 of a pinion 23 pivotally mounted by a bushing 25 to a boss 27 formed on the interior of a body 19 of the mechanism 13. The bushing 25 is maintained in this position by a retaining ring 29 in groove 31 in pinion 23.

Whenever the front axle shaft 17 is rotated, it rotates the pinion 23. When hub clutch ring assembly 33 is not engaged with the pinion 23, as shown in FIG. 3, the pinion 23 just idles to provide free wheeling of the hub. The mechanism 13 is provided with a control dial 35 rotatably mounted in an end cap 37 and held by a retaining ring 39 in an annular groove 41 at the end of an exteriorly threaded, tubular portion 43 of the dial 35. The retaining ring 39 also holds a friction disc 45 against the backside 47 of an inwardly directed flange 49 of an end cap 37, which is bolted to the body 19. A dust seal 51 between the periphery 53 of the dial 35 and a counter bore 55 in the end cap 37 and an O-ring oil seal 57 are provided to maintain a clean and dry assembly.

Finger grip recesses 59 are provided in face 61 of the dial 35, as best shown in FIG. 2 for manually turning the dial 35 between a lock position and a free position. A spring loaded detent 63 drops into notch 65 when the dial is in the free position and drops into a notch when the dial is in the lock position. The end cap 37 is mounted to the body 13 with capscrews 69 with a gasket 71 therebetween.

A nut 79 forming part of the clutch ring assembly 33 is screwed onto threaded tubular portion 43 of the dial 35 until a hole 77 is aligned with a bore 75 in the flange 49 of the cap 37. Then a splining pin or rod 73 is inserted through the hole 77 and press fitted into the bore. This locks the clutch 33 and the control 35 in a fixed indexed relationship so that at no time, even after disassembly and reassembly, will the clutch ring assembly 33 be in any position other than that indicated on control dial 35. As can be seen in FIG. 3, the end of the pin 73 acts as a stop for movement of clutch 81 in movement away from the pinion 23.

The clutch 81 is joined to the nut 79 by means of four truncated pyramid-type barrel springs 83. One end of each spring is tightly wound at 87 to simulate a thread and is screwed into a threaded bore 85 in the clutch 81. There are counterbores in the clutch 81 to give clearance for coils 91 of the springs 83. The outboard (right hand as viewed in FIG. 8) end portions 93 of the barrel springs 83 are also tightly wound, fit into holes 95 in the nut 79 and are secured to the nut 79 by pop rivets 97. The use of the barrel-type springs 83 is more effective in that the coils, particularly the tapered portions near the ends, tend to nest within one another when the springs are fully compressed, and in the installation shown with both ends anchored, the springs act both in tension and in compression. The inside of the body 19 has splines 99 which the nut 79 and clutch 81 engage and are guided both when the clutch is engaged and when the clutch is disengaged. These splines 99 also prevent any rotation of the nut 79 and allow only longitudinal movement of the nut relative to the body, the nut having splinging lugs 101 (FIGS. 5 and 6) meshing with the splines 99. The nut 79 does not have standard type threads on it but instead the nut is thin and has four helically parallel thread tangs or segments 103 (FIGS. 3 and 5), each of slightly less than 90° length formed on its inside and the tangs 103 engage the threads 43 of the one piece control dial 35. There are four threads 43 of acme form, each thread extending about one and one quarter turns about the axis of the tube. The dial has a chamfer 141 (FIG. 4) extending 340° to leave an unchamfered or stop portion 143 centered on the ball detent 67. The stop portion 143, when the dial is in the "free" position, engages one side of a stop (not shown) of 10° arc positioned in counterbore 145 in the cap 37 and integral with the cap 37. When the dial is in its "lock" position, the stop portion 143 engages the other side of the stop in the counterbore 145. The stop portion 143 is of 20° length so the total permitted rotation of the dial is about 330°. When the clutch 81 is engaged as illustrated in FIG. 6, the torque from the axle shaft 17 is transmitted through spline 21, pinion teeth 107, spline teeth 109 of the clutch 81, external teeth 105 of the clutch 81 (FIG. 5) through the internal spline teeth 99 of the body 19 thereby driving the front wheel hub 11 and wheel (not shown). A thrust ringer washer 110 is provided for the pinion 23 and clutch 81.

OPERATION

In FIG. 2 the control dial 35 of the hub clutching mechanism 13 is shown in its free wheeling or disengaged position. If it is desired to drive the front wheels, the vehicle is first stopped. The operator grasps the control dial 35 in the finger grip holes 59 and rotates the control dial 35 clockwise to a position such that arrow 111 on face 61 of the dial points to dot 113 adjacent the word "lock" on the end cap 37, the ball detent 62 then drops into the notch 57. This shifts the hub clutch ring assembly 33 from the position shown in FIG. 3 to the position shown in FIG. 4 by means of the threads 43 rotating in the tangs 103, the lugs 101 preventing the nut 79 from rotating so that the resulting motion of the nut is along its longitudinal axis. In FIG. 4, the clutch 81 has not engaged the splining teeth 107, assuming that the teeth 109 of the clutch 81 did not perfectly align with teeth 107 of the pinion 23. However, the barrel spring 83 is compressed so that when the vehicle is rolled slightly the teeth 107 and 109 move and the clutch is moved by the springs to move the teeth into meshing positions as shown in FIG. 6. The front hub 19 is now ready to assist in driving the vehicle. When the need of driving the front wheels has passed, the vehicle is again stopped and the control dial 35 is rotated counter clockwise so as to locate the arrow 111 in a position pointed at the dot 115 adjacent the word "free," the spring loaded detent 63 is relocated in notch 65 to hold control dial 35 in that position.

In FIG. 7 the nut 79 is shown in its retracted or free wheeling position and with the clutch 81 slightly hung up on the teeth 107 of the pinion 23, which can occur occasionally. However, the barrel springs 83 are now in tension and withdraw the clutch 81 from pinion 23 as soon as the vehicle is rolled slightly.

Since the splining rod 73 holds the actuator nut 79 against rotation relative to the cap 37, and since the rotation of the dial between the "free" and the "lock" positions is less than 360°, it is only necessary, in correctly assembling the cap 37, the nut 79 and the dial 35, that the nut be on the tubular portion 43 and the rod 73 extend through the hole 77. This precisely indexes the nut relative to the cap.

Each of the springs 83 is double acting, while being only a single spring. That is, the spring acts both in compression and in tension to insure throwing the clutch in and throwing the clutch out. The springs form simple, reliable and inexpensive actuating structure.

The pop rivets 97 prevents the springs 83 from turning. Thus, the springs cannot accidentally unscrew from the tapped bores 85.

While the hub shown is for a front wheel, it could readily be used for a rear wheel. Also, while the hub shown has a pinion 21 forming a splined connection between the axle shaft 17 and the body 19, the shaft could have a spline connection directly with the body.

The use of the term "drive" when referring to the operative connection furnished by the hub in its clutch-engaged position, is meant to include "back-drive" conditions; i.e., when the clutch is engaged and the engine compression is used to retard movement of the vehicle.

The pop rivets 97, for securing the outboard ends of the springs 83 to the nut 79, are to be considered as only one form of fastening means that could be used for such purpose.

While the clutch ring 33 may be "freed" by rolling the vehicle slightly (when the ring is stuck) it is immaterial how relative motion of the parts is obtained.

What is claimed is:

1. In a wheel hub clutching mechanism,
mounting means including a body and a cap mounted on the body,
a manually operable driver mounted rotatably on the cap,
an actuator driven by rotation of the driver,
clutch means movable by the actuator,
and splining means separate from said body and carried by and coupling the cap and the actuator to assure proper indexing of the driver and the actuator during assembly.

2. The wheel hub clutching mechanism of claim 1 wherein the driver includes a threaded driving portion and the actuator comprises a nut screwed on the driving portion.

3. The wheel hub clutching mechanism of claim 2 wherein the splining means comprises a rod secured to the cap and the nut having a bore through which the rod extends.

4. The wheel hub clutching mechanism of claim 3 wherein the driver includes a dial portion and the mounting means includes means mounting the dial portion rotatably on the cap so that the driver, the cap and the splining means comprise a unitary structure.

5. The wheel hub clutching mechanism of claim 4 wherein the body has internal splines, the nut having external splines meshing with the splines of the body.

6. The wheel hub clutching mechanism of claim 5 wherein the clutch means includes a clutch member having external splines meshing with the splines of the body.

7. The wheel hub clutching mechanism of claim 6 including double acting springs having close-wound end portions screwed into tapped bores in the clutch member and means securing the other ends of the springs to the nut.

8. The wheel hub clutching mechanism of claim 7 wherein the fastening means includes pop rivets.

9. The wheel hub clutching mechanism of claim 2 wherein the nut comprises a plate having internal thread segments twisted out of the plane of the plate to conform generally to the helices.

10. In a wheel hub clutching mechanism,
clutch means including a clutch member movable between a clutching position and a declutching position,
an actuator for moving the clutch member between said positions,
and a plurality of double acting springs each connected at one end thereof to the clutch member and at the other end thereof to the actuator for pushing and pulling the clutch member between said positions, wherein each spring is of the barrel type having truncated frustoconical end portions.

11. The wheel hub clutching mechanism of claim 10 wherein one end portion of each spring is close wound to form a thread which is screwed into a tapped bore in the clutch member.

12. The wheel hub clutching mechanism of claim 10 including means securing one end portion of each spring to the clutch member, and fastening means anchoring the other end portion of each spring in the actuator.

13. The wheel hub clutching mechanism of claim 12 wherein the fastening means comprises a pop rivet securing said other end of the spring in a bore in the actuator.

References Cited

UNITED STATES PATENTS

| | | | |
|---|---|---|---|
| 3,184,258 | 5/1965 | Kapusta | 192—67 R |
| 1,577,496 | 3/1926 | Sholberg | 192—94 |
| 3,442,361 | 5/1969 | Hegar | 192—109 AX |
| 2,380,571 | 7/1945 | Barron | 192—70.19 X |
| 3,273,681 | 9/1966 | Seifert | 192—109 AX |

BENJAMIN W. WYCHE, Primary Examiner

U.S. Cl. X.R.

192—89 R, 94, 95, 109 A; 287—53 SS